United States Patent [19]

Medlin

[11] Patent Number: 5,176,345
[45] Date of Patent: Jan. 5, 1993

[54] EXTENSION PLATE FOR OUTLET BOX BRACKET

[76] Inventor: Pauline B. Medlin, P.O. Box 237, Blue Ridge, Va. 24064

[21] Appl. No.: 639,291

[22] Filed: Jan. 10, 1991

[51] Int. Cl.⁵ .............................................. H02G 3/00
[52] U.S. Cl. ................................ 248/205.1; 248/906; 248/300
[58] Field of Search ............... 248/205.1, 906, 27.3, 248/300, 909, 224.4, 225.1; 220/3.9, 3.5, 3.3, 3.2

[56] References Cited

U.S. PATENT DOCUMENTS

| | | | |
|---|---|---|---|
| 2,971,737 | 2/1961 | Parker | 248/906 X |
| 4,183,486 | 1/1980 | Esoldi | 248/906 X |
| 4,645,089 | 2/1987 | Horsley | 220/3.9 X |
| 4,732,356 | 3/1988 | Medlin, Sr. | 248/27.1 |
| 4,757,908 | 7/1988 | Medlin, Sr. | 220/3.9 |
| 4,943,022 | 7/1990 | Rinderer | 220/3.5 X |
| 5,005,792 | 4/1991 | Rinderer | 220/3.5 X |
| 5,031,789 | 7/1991 | Dauberger | 220/3.9 |

Primary Examiner—Karen J. Chotkowski
Attorney, Agent, or Firm—Olive & Olive

[57] ABSTRACT

An extension stabilizer plate for extending the stabilizer plate of an outlet box bracket is formed with a bendable tongue which permits attachment of the extension stabilizer plate to the bracket stabilizer plate without requiring the use of screws.

13 Claims, 4 Drawing Sheets

EXTENSION PLATE FOR OUTLET BOX BRACKET

BACKGROUND OF INVENTION

1. Field of the Invention

The present invention relates to brackets for mounting of electrical equipment, such as electrical outlet and junction boxes, primarily to vertical metal or wooden studs in the space between two walls, during building construction and/or repair. In particular, the present invention relates to extension brackets for use with such mounting brackets to augment the effective length of the brace or stabilizer portion of the mounting bracket.

2. Background of the Prior Art

As used herein, the term "outlet box" is intended to refer to an outlet box, a junction box or both. When outlet boxes are supported from a metal or wooden stud, it has been found desirable to stabilize the cantilevered box and bracket. U.S. Pat. No. 3,767,151 illustrates one means of stabilizing an outlet box by attaching a bracket directly to the box. In U.S. Pat. No. 4,057,164, an adjustable screw is used for stabilizing an outlet box. U.S. Pat. No. 4,399,922 illustrates a unitary mounting bracket in which a portion of the bracket is formed as a brace to stabilize both the bracket and the outlet box and in which break-away strips are employed to vary the length of the brace. Other outlet box mounting brackets suited to utilizing the extension stabilizer plate of the invention are shown in U.S. Pat. Nos. 4,572,391, 4,603,789, 4,688,693, 4,753,361 and 4,757,908. Useful background to the present invention may also be found in U.S. Pat. Nos. 4,533,060 and 4,569,458.

In an outlet box mounting bracket of the type suited to the present invention, one portion of the mounting bracket is typically comprised of a front plate adapted for mounting the outlet box, and another portion comprises a stabilizer plate formed at a right angle to the front plate and which functions as a brace extending between the interior walls. The space between two drywalls in a construction is typically 2½", 3½", 4", 5" or 6", although other dimensions may be used. Differently shaped front plates may be employed for such an outlet mounting bracket, depending upon the application for which the mounting bracket is to be used. While each variation of front plate might be manufactured for each commonly used wall space size, it would obviously be desirable to minimize the number of different types of mounting brackets required on the job. The use of an adjustably mounted extension plate attached to the stabilizer plate permits manufacture of a stabilizer plate geared to a single shorter size of wall space, with primarily reliance placed upon the extension plate to accommodate wider spaces between walls. U.S. Pat. No. 4,732,356 discloses a bendable mounted extension plate which is capable of being mounted at an adjustable variety of lengths to the bracket stabilizer plate, according to the choice of which set of screw holes on the extension plate one chooses to mate with a corresponding set of screw holes on the bracket stabilizer plate.

However, in practice, screw mounted extension stabilizer plates have been found to be somewhat troublesome to stabilize in position for attachment while the screws are being inserted, particularly with powered screwdriver tools. Also, screws add an incremental expense to the cost of the brackets and to the cost of installation. In the situation of the electrical contractor for a large building in which a large number of outlet boxes must be mounted, this added cost can be considerable. A further desirable goal in any construction setting, particularly where adverse weather may sometimes be part of the working environment, is to minimize the need for workers to remove their gloves to adequately achieve installation of the extension stabilizer plates as is sometimes presently required.

With the foregoing as background, the object of the invention is to provide an improved outlet box extension stabilizer plate which permits attachment without the need for screws, is adaptable to a variety of wall spacings and is readily installed by the worker when wearing gloves. Other objects will become apparent as the description proceeds.

SUMMARY OF THE INVENTION

The extension stabilizer plate of the invention is designed for use with an outlet mounting bracket formed with two perpendicular plates, one of which functions as a stabilizer plate to brace the bracket between two wall surfaces. The extension stabilizer plate of the invention is formed from stiff sheet material, and is designed to attach to the bracket stabilizer plate without requiring screws, by means of a fastening tongue with a folding tab formed on the end thereof. The folding tab of the extension stabilizer plate of the invention is passed through a hole in the stabilizer plate of the mounting bracket and is folded over about one hundred eighty degrees (180°) to extend approximately parallel to the fastening tongue but in the opposite direction, so that the fastening tongue and folding tab crimp tightly against opposite sides of the bracket stabilizer plate in a clamp-like relation. The extension stabilizer plate of the invention is further stabilized by a pair of leg-like bracing tabs, which rest against the surface of the bracket stabilizer plate and serve to resist any forces which might otherwise tend to twist the fastening tongue relative to the remainder of the extension stabilizer plate. In a preferable variation, an S-shaped bend is placed at the junction of the fastening tongue with the rest of the extension stabilizer plate. The size of the S-bend is designed to offset the plane of the tongue from the plane of the rest of the extension stabilizer plate by an amount which is substantially equal to the thickness of the bracket stablilizer plate. Parallel V-shaped reinforcing grooves extend lengthwise of the extension stabilizer plate and on opposite sides of the tongue to stiffen the extension stabilizer plate of the invention.

In a second embodiment of the invention, the extension stabilizer plate is formed with a pair of parallel extension legs which extend outward from one end of the extension stabilizer plate opposite the end on which the fastening tongue and bracing tabs are located. These extension legs may be bent to facilitate shortening of the extension stabilizer plate or may be cut off along a straight line with an ordinary crimping tool. In a third embodiment, the extension stabilizer plate is equipped with a transverse slot to facilitate shortening of the extension stabilizer plate by bending it or cutting it off parallel to and adjacent to the slot. As will be apparent, both the mentioned S-bend feature and reinforcing grooves are compatible with each of the embodiments of the invention.

BEST MODE FOR CARRYING OUT THE INVENTION

Figure 1:
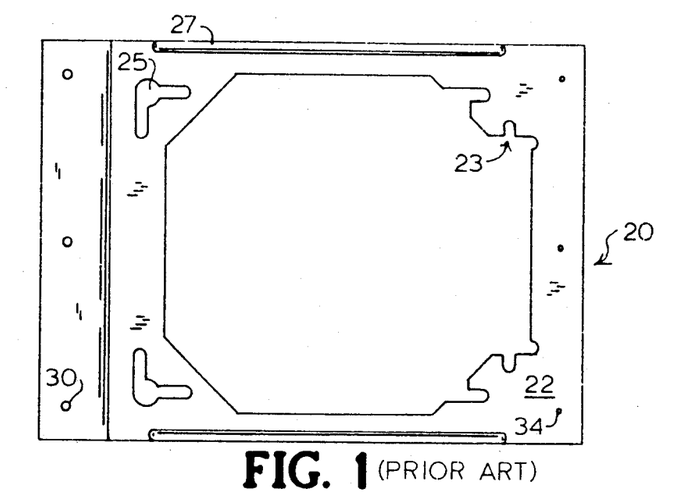
FIG. 1 is a front elevation view of the front plate of a prior art mounting bracket.
Figure 2:
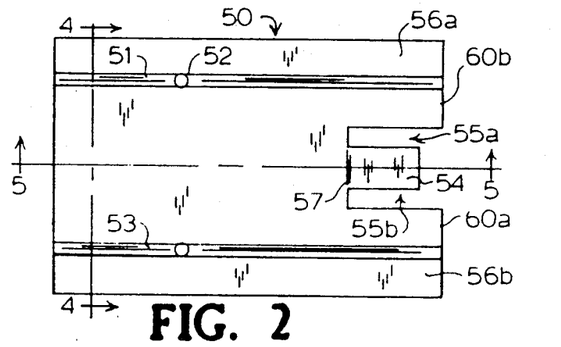
FIG. 2 is an elevation view of the backside of a dismounted extension stabilizer plate according to a first embodiment of the invention.
Figure 3:
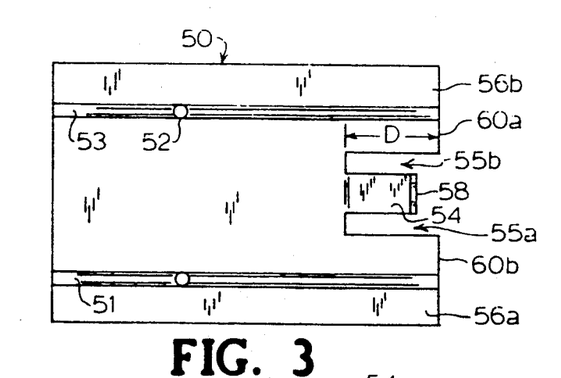
FIG. 3 is an elevation view of the front side of the extension stabilizer plate of FIG. 2.
Figure 4:
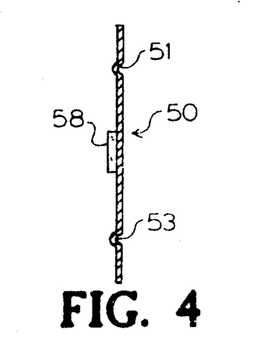
FIG. 4 is a section view taken in the direction of line 4—4 of FIG. 2.

A type of mounting bracket 20 suited to utilizing the extension stabilizer plate of the invention is shown in FIG. 1 and follows the construction of U.S. Pat. No. 4,757,908 the description of which is incorporated herein by reference. As fully explained in that patent and as illustrated in FIG. 1 of the present application, the mounting bracket 20 incorporates a front plate 22 having a series of slots 23 and openings 25 as shown for receiving the mounting screws of an outlet box as more fully described in the patent. Stiffening indentations 27 are formed in front plate 22. Holes 30 receive fasteners, not shown, for securing the bracket 20 to a stud 32 as in FIG. 9. Other holes 34 are provided for joining one bracket to another and for other purposes as set forth in U.S. Pat. No. 4,572,391 the description of which is also incorporated herein by reference.

Figure 6:
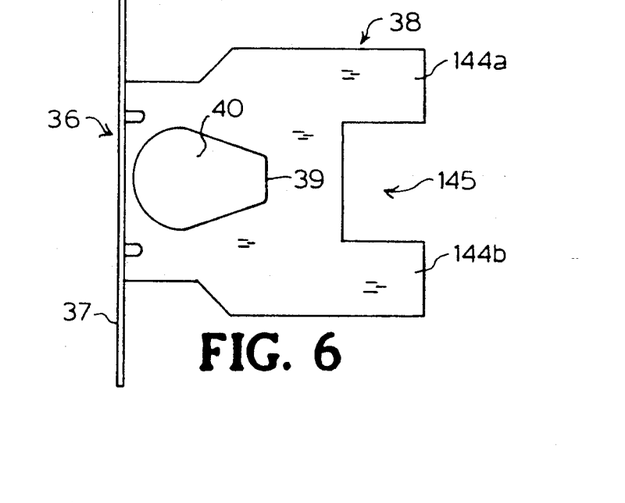
FIG. 6 is an elevation view of the prior art mounting bracket of FIG. 1 with a form of integral stabilizer plate suited to mounting the extension stabilizer plate of the invention shown in FIG. 2.

What is to be particularly appreciated from the description to follow is that in the outlet box mounting bracket 36, illustrated in FIG. 6, the bracket stabilizer plate 38 is formed with opening 40 but without screw holes and thus permits attachment of the extension stabilizer plate of the invention with the tab bending arrangement as seen in FIGS. 7-14.

As previously described, the conventional outlet box mounting bracket for mounting an outlet box is formed of an integral piece of sheet metal and comprises a front plate having a large central opening which registers with the outlet box and to which the outlet box is secured. A stabilizer plate extends perpendicular to the front plate and is of some predetermined length to accomodate to a particular wall spacing. Three embodiments of the extension stabilizer plate of the invention are shown, each of which is adapted to be attached without the use of screws to the stabilizer plate of the bracket to accomodate to a wall spacing which is greater than the wall spacing for which the bracket stabilizer plate was designed. Other accomodation to variations in wall spacing is effected by being able to cut or bend portions of the extension stabilizer plate as later explained.

Figure 8:
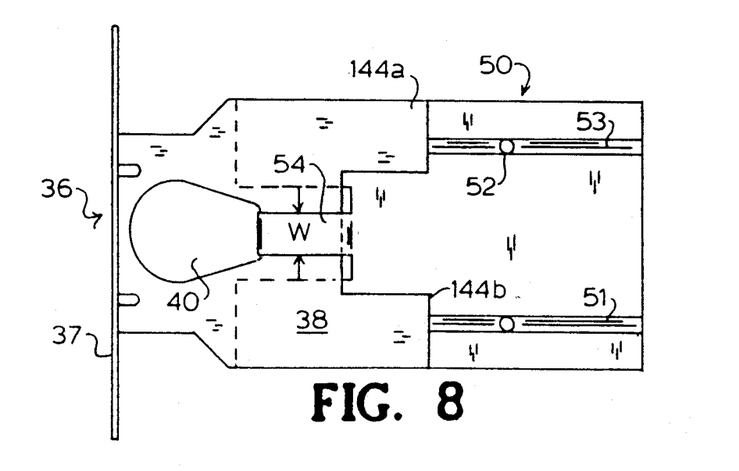
FIG. 8 is an elevation view similar to FIG. 7 but taken from the opposite side of the bracket stabilizer plate.

FIGS. 2-5 illustrate the basic version of what is referred to as a leg-type extension stabilizer plate 50 according to a first embodiment of the invention. Leg-type extension bracket 50 is preferably formed from a single sheet of relatively stiff sheet metal material of similar thickness and characteristic to that used for the mounting bracket 20 (FIG. 1) or 36 (FIG. 8). Leg-type extension stabilizer plate 50 may include screw holes 52 as depicted in the illustrations. Leg-type extension stabilizer plate 50 also has two legs or bracing tabs 56a, 56b, each of which has an end edge 60a, 60b. V-shaped grooves 51, 53 extend lengthwise of the substantially rectangular extension stabilizer plate 50 and add rigidity to the plate.

Figure 5:
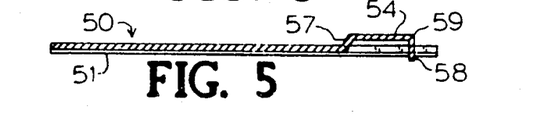
FIG. 5 is a section view taken in the direction of line 5—5 of FIG. 2.

A primary advantage of the leg-type extension stabilizer plate 50 of the invention is that it can be mounted without using any screws, when used with a suitably formed bracket stabilizer plate as further described. For this purpose there is located within a rectangular open-ended slot at one end of the extension stabilizer plate 50 and midway between the two bracing tabs 56a, 56b forming in the slot a fastening tongue 54 symmetrically separated from each of the bracing tabs 56a, 56b by respective interstices 55a, 55b between the tongue 54 and the respective bracing tabs 56a, 56b. The length of the rectangular, strip-like tongue 54 is substantially equal to the depth D (FIG. 3) of the open-ended slot in which tongue 54 is located. Preferably, the fastening tongue 54 joins at the body of the leg-type extension stabilizer plate 50 with an S-bend 57. Because of S-bend 57, fastening tongue 54 is oriented approximately parallel to the plane of the leg-type extension stabilizer plate 50 and is offset by an amount approximately equal to the thickness of the metal sheet forming the leg-type extension stabilizer plate 50. Outward from the S-bend 57, fastening tongue 54 forms a flat planar projection near its outer end, where it undergoes a uniform bend along tongue fold line 59 (FIG. 5) to form a flat folding tab 58. The direction of bend along tongue fold line 59 for tab 58 is generally opposite the direction of offset of S-bend 57 as best seen in FIG. 5.

FIG. 6 shows the previously referred to modified bracket stabilizer plate 38 with the wiring opening 40 having two identical stabilizer bracing tabs 114a, 144b separated by a stabilizer tab interstice 145.

Figure 7:
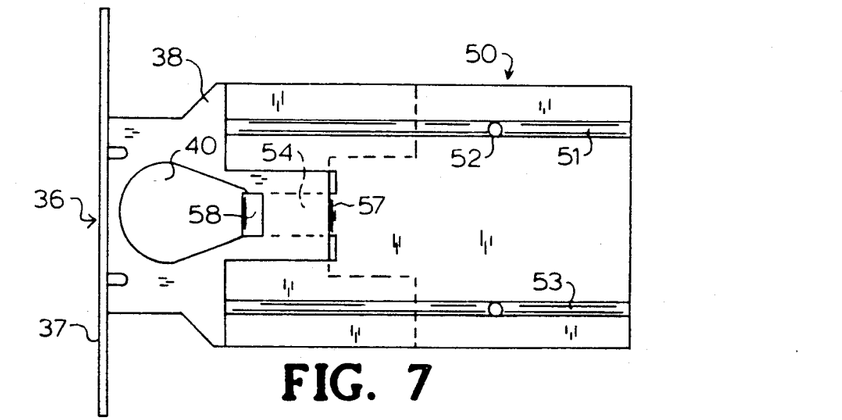
FIG. 7 is an elevation view of the mounting bracket of FIG. 6 with the extension stabilizer plate of the invention as seen in FIG. 2 mounted on the bracket stabilizer plate using a bendable tab for securement.

FIGS. 7 and 8 show the leg-type extension stabilizer plate 50 attached to the modified bracket stabilizer plate 38 of FIG. 6. In FIGS. 7 and 8, the extension stabilizer plate bracing tabs 56a, 56b (FIG. 2) are shown overlapping the modified bracket stabilizer plate 38 and its stabilizer bracing tabs 144a, 144b with the overlapping portions being substantially parallel and substantially in surface-to-surface contact with one another. Fastening tongue 54 is shown in FIG. 7 positioned behind and lying proximately flush against the modified bracket stabilizer plate 38. An opposite view is shown in FIG. 8. The folding tab 58 extends through the wiring hole 40 with the tongue fold line 59 (FIG. 5) approximately flush with the base 39 (FIG. 6) of wiring hole 40. Tab 58 is bent through a total angle of approximately one hundred eighty degrees (180°), so that folding tab 58 and fastening tongue 54 are crimped securely against opposite sides of the modified bracket stabilizer plate 38, resting approximately parallel to one another. As will be apparent from FIGS. 7 and 8, the extension stabilizer plate 50 is held in position with respect to modified bracket stabilizer plate 38 by reason of the junction of fastening tongue 54 with folding tab 58 along tongue fold line 59 inhibiting extension stabilizer plate 50 from moving in a direction away from wiring hole 40 and front panel 37. The positioning of folding tongue 54 and bracing tabs 56a, 56b (FIG. 2) on opposite sides of the modified bracket stabilizer plate 38 also inhibits the extension stabilizer plate 50 from moving toward wiring hole 40 and front panel 37. The length of the base 39 (FIG. 6) of hole 40 only slightly exceeds the width W (FIG. 8) of tongue 54 and this further inhibits lateral movement of the extension stabilizer plate 50 on the bracket stabilizer plate 34.

Figure 9:
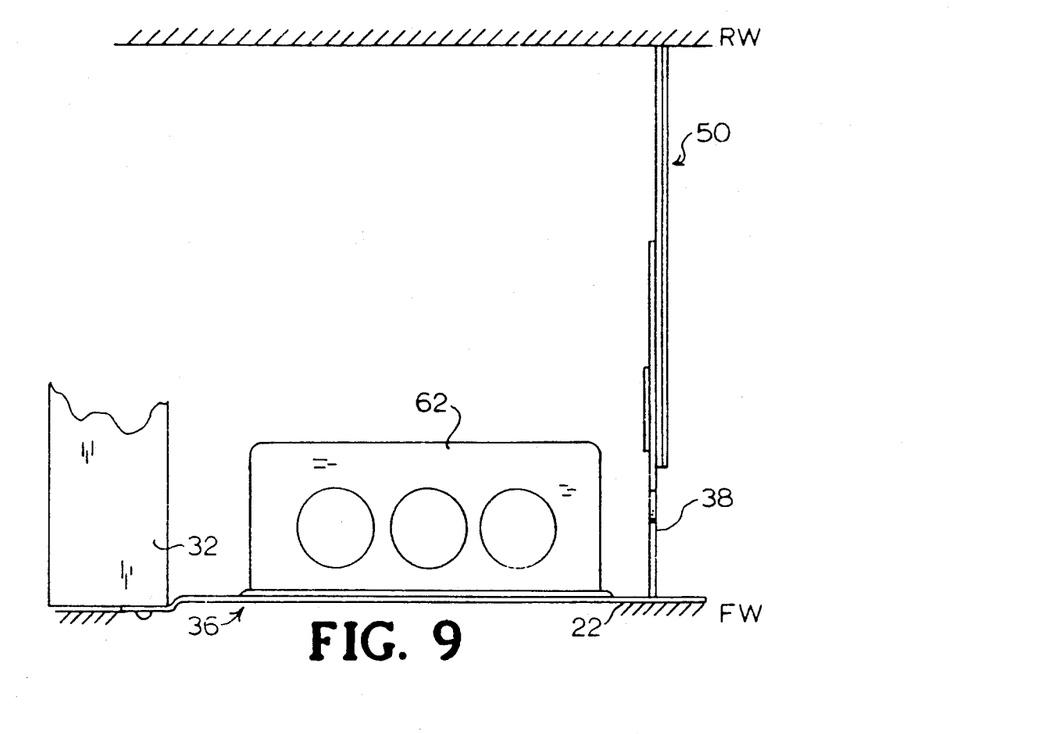
FIG. 9 is a top plan view of the mounting bracket of FIG. 6 with the extension stabilizer plate of the invention as seen in FIG. 2 attached and mounted between a front and a rear wall and the bracket secured to a wall stud, with a junction box mounted on the front plate, and with the outer edge of the extension stabilizer plate of the invention abutting the rear wall.

FIG. 9 illustrates a typical use in practice of mounting bracket 36 using a modified bracket stabilizer plate 38 and leg-type extension stabilizer plate 50 to mount a junction box 62 to a metal stud 32 in a wall space between a front wall FW and rear wall RW.

Figure 10:
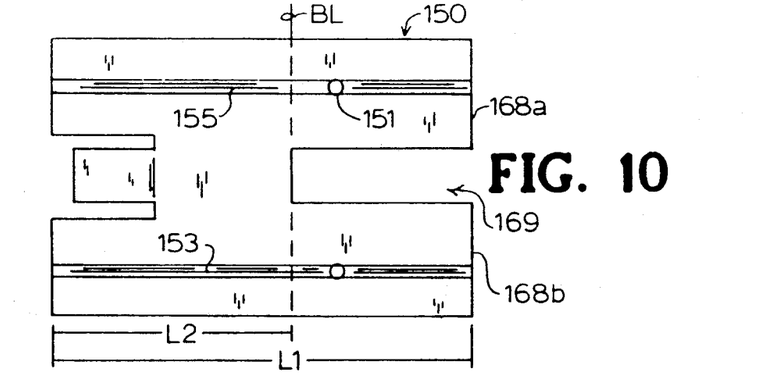
FIG. 10 is an elevation view of the backside of an extension stabilizer plate according to a second embodiment of the invention and formed with bendable legs so as to permit bending to accommodate to different wall spacings.
Figure 11:
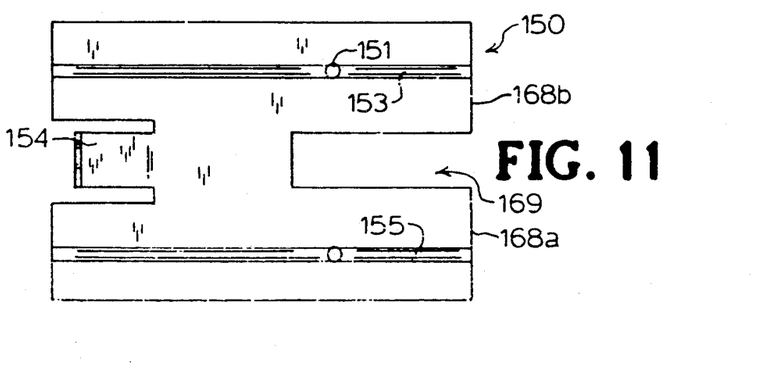
FIG. 11 is an elevation view similar to FIG. 10 but taken from the opposite front side of the extension stabilizer plate.
Figure 12:
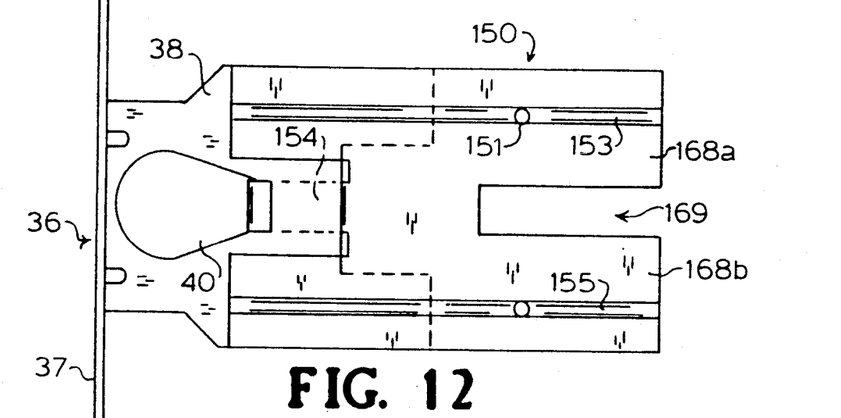
FIG. 12 is an end elevation view of the mounting bracket of FIG. 6 with the extension stabilizer plate of the invention as seen in FIG. 11 secured by a bendable tab and in a form suited to being bent or cut to accomodate to a particular wall spacing.

FIGS. 10–12 illustrate what will be referred to as an H-leg extension stabilizer plate 150, according to a second embodiment of the invention. The H-leg extension bracket 150 includes a fastening tongue 154 which corresponds to the previously described fastening tongue 54. Stiffening grooves 153, 155 are provided in addition to optional screw holes 151. The H-leg extension stabilizer plate 150 is distinguished from the previously described leg-type extension stabilizer plate 50 by having a pair of extension legs 168a, 168b separated by a bracket leg interstice 169. FIG. 12 shows the H-leg extension stabilizer plate 150 mounted on outlet box mounting bracket 36 having a modified bracket stabilizer plate 38, in the same fashion as shown in FIG. 7 for the leg-type extension bracket 50. The extension bracket legs 168a, 168b permit an H-leg extension stabilizer plate 150 manufactured at length L1 (FIG. 10) to be conveniently and effectively altered to a length as short as the illustrated length L2. To achieve this alteration, the extension bracket legs 168a, 168b can be readily bent on bend line BL (FIG. 12) ninety degrees (90°) or cut off, each at the same relative position, by use of an ordinary crimping tool or pliers. The shortening of the H-leg extension bracket 150 can be done most cleanly and accurately along bend line BL of the extension stabilizer plate legs 168a, 168b i.e. leaving a remaining length L2. Therefore, lengths L1 and L2 are preferably chosen to correspond to two of the most commonly encountered wall spacings.

Figure 13:
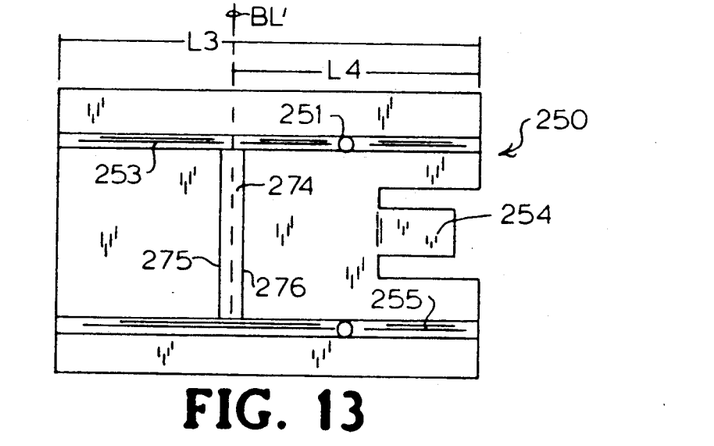
FIG. 13 is an elevation view of the backside of an extension stabilizer plate according to a third embodiment of the invention and being formed with a slot to facilitate bending of the extension stabilizer plate to accomodate to different wall spacings.
Figure 14:
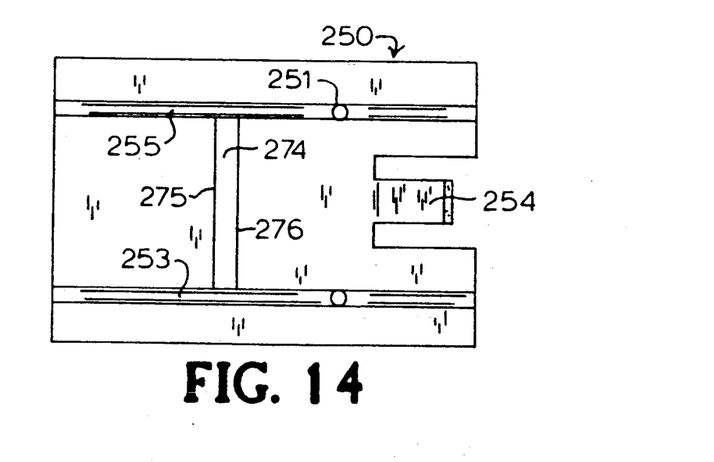
FIG. 14 is an elevation view similar to that of FIG. 13 but taken from the opposite front side of the extension stabilizer plate.

FIG. 13–14 illustrate a slotted form of leg-type extension stabilizer plate 250, according to a third embodiment of the invention. The slotted form of leg-type extension stabilizer plate 250 includes a fastening tongue 254 corresponding to fastening tongue 54. Stiffening indentations 253, 255 are included in addition to optional screw holes 251. The slotted form of leg-type extension stabilizer plate 250 is distinguished from the first described leg-type extension stabilizer plate 50 by a slot 274 at a displacement rearward of the fastening tongue 254 and oriented perpendicular thereto. Slot 274 permits the slotted form of leg-type extension stabilizer plate 250 manufactured at length L3 to be conveniently and effectively altered to a shorter length L4. To achieve this alteration, the slotted form of leg-type extension stabilizer plate 250 can be either bent ninety degrees (90°) or cut off symmetrically along bend line BL' or along a line coinciding with one side of slot 274 by an ordinary crimping tool or pliers in a manner analogous to that previously described for the H-leg extension stabilizer plate 150. However, the slotted form of leg-type extension stabilizer plate 250 is particularly designed for being cut or bent along a line coinciding with line 275 or 276, adjacent and parallel to the slot 274. In this manner, it will be possible to achieve clean, parallel, and symmetrical cuts or ninety degree (90°) bends precisely along a line coinciding with line 275 or 276. Therefore, the location of the slot 274 and its boundary lines 275, 276 are chosen to correspond to commonly encountered wall spacings.

I claim:

1. An extension stabilizer plate for extending the stabilizer plate of an outlet box mounting bracket formed of sheet metal and having a front plate with a large central opening formed to register with the interior chamber of an outlet box secured thereto, said large central opening being located between an inner end of the plate formed for being secured to a stud and an outer end, and a right angular stabilizer plate formed with an opening and disposed at the outer end of said front plate and including an outer edge adapted to engage a wall surface during use located opposite the outer end of the front plate when said front plate inner end is secured to a wall stud, said extension stabilizer plate comprising:

(a) a substantially flat rectangular plate member formed of sheet metal;
   (b) a bendable tongue member formed of said metal as an integral part of said plate member; and
   (c) said bendable tongue member being shaped and located on said plate member in a generally coplanar relation and in a manner wherein a portion of said bendable tongue member is bent over and engages a selected portion of a right angular bracket stabilizer plate disposed at the outer end of said front plate causing said plate member during use to be fixedly secured thereto, to form an extension thereof, and to stabilize the bracket's plate by having an outer edge of said plate member positioned to contact a wall surface located opposite the outer end of the front plate of the bracket.

2. An extension stabilizer plate as claimed in claim 1 wherein said bendable tongue member is shaped and located on said plate member in a manner wherein said bendable tongue member is inserted through one side of an opening in a stabilizer plate having such an opening and is bent against the metal material surrounding the opposite side of such opening to secure said plate member during use to said stabilizer plate and to form an extension thereof.

3. An extension stabilizer plate as claimed in claim 1 wherein said plate member is formed at one end with an open-ended rectangular slot and said bendable tongue member is formed as a rectangular strip centrally positioned within said slot.

4. An extension stabilizer plate as claimed in claim 3 wherein said slot is defined by side edges located inwardly from and parallel to the side edges of said plate member and a base edge parallel to the end edges of said plate member and located inwardly from one end edge of said plate member, said slot side edges being substantially equal to the length of said tongue member, said bendable tongue member being appended to said slot base edge and having a S-like bend at the juncture of said bendable tongue member and said slot base edge effective to offset said bendable tongue member from one side surface of said plate member by a distance substantially equal to the thickness of the metal of which said plate member is formed.

5. An extension stabilizer plate as claimed in claim 1 wherein said bendable tongue member is located at one end of said plate member and the opposite end of said plate member includes a predetermined length thereof defined for being bent or removed to shorten the effective length of said plate member.

6. An extension stabilizer plate as claimed in claim 5 wherein said plate member is formed with a transverse slot intermediate the length thereof and said slot defines a length of said plate member for being bent or removed.

7. An extension stabilizer plate as claimed in claim 5 wherein said bendable tongue member is formed at one end of said plate member and the opposite end of said plate member is formed with an open-ended slot bounded by defined bendable or removable leg portions facilitating shortening of the effective length of said plate member.

8. An extension stabilizer plate as claimed in claim 1, comprising:
 (a) a pair of parallel, spaced apart, outwardly extending bracing tabs formed at one end of said plate member and coplanar therewith;
 (b) said bendable tongue member being outwardly extending, located between said bracing tabs and residing in a generally coplanar relation to said plate member in a plane parallel to and offset from the plate of said plate member;
 (c) said bracing tabs being formed and mounted in adjacent parallel relation on a first surface of said stabilizer plate;
 (d) said bendable tongue member being mounted on a second surface of said stabilizer plate opposite said first surface; and
 (e) said tongue member having a bendable tab portion engaging said opening in said stabilizer plate and said tongue and bracing tabs being mounted on opposite surfaces of said stabilizer plate.

9. An outlet box mounting assembly comprising:
(a) an outlet box mounting bracket formed of sheet metal and having a front plate with a large central opening formed to register with the interior chamber of an outlet box secured thereto, said large central opening being located between an inner end of the plate formed for being secured to a stud and an outer end, and a right angular stabilizer plate formed with an opening and disposed at the outer end of said front plate and including an outer edge adapted to engage a wall surface during use located opposite the outer end of the front plate when said front plate inner end is secured to a wall stud; and
(b) an extension stabilizer plate comprising:
 (i) a substantially flat rectangular plate member formed of sheet metal;
 (ii) a bendable tongue member formed of said metal as an integral part of said plate member; and
 (iii) said bendable tongue member being shaped and located on said plate member in a generally coplanar relation and in a manner wherein a portion of said bendable tongue member is bent over and engages a selected portion of said right angular bracket stabilizer plate disposed at the outer end of said front plate causing said plate member during use to be fixedly secured thereto, to form an extension thereof, and to stabilize the bracket's front plate by having an outer edge of said plate member positioned to contact a wall surface located opposite the outer end of the front plate of the bracket.

10. An extension stabilizer plate for extending the stabilizer plate of an electrical box mounting bracket formed of sheet metal and having a front plate with inner and outer ends and a right angular stabilizer plate formed with an opening and disposed at the outer end of said front plate and including an outer edge adapted to engage an opposing wall surface during use when the inner end of said front plate is secured to a wall stud, said extension stabilizer plate comprising:
(a) a substantially rectangular plate member formed of sheet metal;
(b) a bendable tongue member formed of said metal as an integral part of said plate member; and
(c) said bendable tongue member being shaped and located on said plate member in a generally coplanar relation and in a manner wherein a portion of said bendable tongue member is bent over and engages a selected portion of a bracket stabilizing plate causing said plate member during use to be fixedly secured thereto and to form an extension thereof.

11. An extension stabilizer plate as claimed in claim 10 wherein said bendable tongue member is located at one end of said plate member and the opposite end of said plate member includes a predetermined length thereof defined for being bent or removed to shorten the effective length of said plate member.

12. An electrical box mounting assembly comprising:
(a) an electrical box mounting bracket formed of sheet metal and having a front plate with inner and outer ends and a right angular stabilizer plate formed with an opening and disposed at the outer end of said front plate and including an outer edge adapted to engage an opposite wall surface during use when said front plate inner end is secured to a wall stud; and
(b) an extension stabilizer plate comprising:
 (i) a substantially flat rectangular plate member formed of sheet metal;
 (ii) a bendable tongue member formed of said metal as an integral part of said plate member; and
 (iii) said bendable tongue member being shaped and located on said plate member in a generally coplanar relation and in a manner wherein a portion of said bendable tongue member engages and is bent over a selected portion of said bracket stabilizer plate enabling said plate member during use to be fixedly secured thereto and to form an extension thereof.

13. An extension stabilizer plate for extending the stabilizer plate of an outlet box mounting bracket having a front plate with inner and outer ends and a right angular stabilizer plate formed with an opening and disposed at the outer end of said front plate and including an outer edge adapted to engage an opposing wall surface during use when said front plate inner end is secured to a wall stud, said extension stabilizer plate comprising:

(a) a substantially flat rectangular plate member;
(b) a clamping member formed from the material of said plate member as an integral part of said plate member; and
(c) said clamping member being shaped and formed and located on said plate ember in a generally coplanar relation and in a manner wherein a portion of said clamping member engages, receives and is effectively clamped to a selected portion of a right angular bracket stabilizer plate positioned on a said front plate outer end enabling said plate member during use to be fixedly secured thereto and to form an extension thereof.

* * * * *

UNITED STATES PATENT AND TRADEMARK OFFICE
CERTIFICATE OF CORRECTION

PATENT NO. : 5,176,345
DATED : January 5, 1993
INVENTOR(S) : Pauline B. Medlin It is certified that error appears in the above-identified patent and that said Letters Patent is hereby corrected as shown below:

In column 6, line 60, insert --front-- after bracket's.

In column 10, line 6, correct "ember" to read --member--.

Signed and Sealed this

Twenty-sixth Day of October, 1993

Attest:

BRUCE LEHMAN

*Attesting Officer*  *Commissioner of Patents and Trademarks*